UNITED STATES PATENT OFFICE 1,969,464

DYEING AND PRINTING OF ACETATE SILK

Karl Holzach, Ludwigshafen-on-the-Rhine, and Guido von Rosenberg, Mannheim, Germany, assignors to General Aniline Works, Inc., New York, N. Y., a corporation of Delaware No Drawing. Application October 28, 1932, Serial No. 640,132. In Germany July 5, 1928

8 Claims. (Cl. 8—5)

The present invention relates to the dyeing and printing of acetate silk.

We have found that valuable dyed or printed acetate silk is obtained by employing dyestuffs produced by coupling diazo compounds free from sulfonic and carboxylic acid groups with hydroxy-quinolones which are also free from the said groups, corresponding to the general formula:

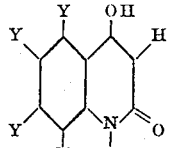

in which R stands for an alkyl radical, for example methyl or ethyl, and Y for hydrogen or any substituent other than sulphonic and carboxylic acid groups, for example halogen or the amino or nitro group. Especially valuable are dyestuffs derived from alkylated 4-hydroxy-2-quinolones containing the aforesaid substituents in the 6-position. The affinity of the said dyestuffs which are insoluble in water, to acetate silk is good and in many cases even extremely good. For example, dyestuffs obtained by coupling the diazo compounds of aniline or its homologues with N-methyl-4-hydroxy-2-quinolone, give dyeings on acetate silk having valuable greenish yellow shades and excellent fastness properties. The said dyestuffs are likewise suitable for printing on acetate silk.

The shade of the dyeings and printings on acetate silk can be varied within wide limits by selecting dyestuffs of the kind in question containing appropriate diazo or coupling components. Acetate silk dyed with the dyestuffs according to the present invention, especially those derived from diazotized m-nitraniline, has valuable properties; the fastness to light of the dyeings is usually good, in some cases even very good, as is also the fastness to ironing; the fastness to washing and to the action of chlorine, of water and of acids is excellent in most cases. Especially greenish yellow shades possessing extremely good fastness properties which are obtained with dyestuffs made from appropriate diazo components can thus be produced. Again, the dyeings according to the present invention are not phototropic.

The dyeing of the acetate silk may be carried out according to any process suitable for dyeing acetate silk with the use of water-insoluble dyestuffs.

The following examples will further illustrate the nature of the said invention, but the invention is not restricted to these examples. The parts are by weight.

Example 1

Acetate silk is dyed in a bath (the dye bath proportion being about 1:30) containing 0.2 to 0.5 gram of an emulsifying agent such as a condensation product of ethylene oxide and octodecyl alcohol per litre and between about 0.1 to 2.0 per cent (calculated on the material to be dyed according to the desired depth of color) of the dyestuff obtainable by coupling diazotized p-chloraniline with 6-chlor-N-ethyl-4-hydroxy-2-quinolone for ½ to 1 hour at from 60 to 75° C. The acetate silk is dyed very clear greenish yellow shades possessing excellent fastness properties.

Similar results are obtained when the dyeing is carried out according to other processes usual for dyeing acetate silk with dyestuffs difficultly soluble or insoluble in water, for example in weakly acid or salt containing baths. When mixed fabric, for example mixed cotton-acetate silk fabric, is treated in the dye bath, the acetate silk only is dyed.

If instead of the dyestuff mentioned above the dyestuff obtainable by coupling diazotized p-amino-dimethylaniline with N-methyl-4-hydroxy-2-quinolone is used, very strong, red-violet dyeings are obtained.

Valuable printings on acetate silk may also be obtained by means of the above mentioned dyestuffs.

Example 2

The dyestuff obtainable by coupling diazotized m-nitraniline with N-methyl-4-hydroxy-2-quinolone is added in the desired proportion (about 10 to 30 parts) to a printing paste containing 80 parts of glycerine, 720 parts of a solution of British gum (1:1), 25 parts of methylcyclohexanone and about 150 parts of water. This paste is printed on acetate silk in the usual manner. The material is dried and then steamed for ½ hour without the application of pressure and then weakly soaped. Yellow printings of extremely good fastness properties are obtained.

The affinity to acetate silk of the dyestuff described is much higher than that of the dyestuff prepared from the same diazo compound and 2.4-dihydroxyquinoline. Therefore the acetate silk dyed with the latter under otherwise the same conditions is inferior to acetate silk dyed with the dye mentioned in the first paragraph of this example.

Instead of the printing paste described above also other usual mixtures may be employed. The dyestuff mentioned above is also extremely suitable for producing dyeing on acetate silk.

Dyestuffs prepared from the diazo compounds of other substitution products of benzene or its homologues and from substituted or other unsubstituted N-alkyl-4-hydroxy-2-quinolones may be employed in a similar manner as described above.

Example 3

The dyestuff obtainable by coupling diazotized 4-chlor-3-nitraniline with N-methyl-4-hydroxy-2-quinolone is added in a quantity varying according to the desired depth of color between about 0.1 to 2 per cent calculated on the material to be dyed to a dye bath which contains 2 to 3 grams of soap per litre and acetate silk is dyed in the said dye bath (used in a proportion of about 1:30) for ½ to 1 hour at a temperature of between 60 to 75° C. The acetate silk is dyed clear yellow shades.

In an analogous manner dyeings of somewhat more greenish shades are obtained by means of the dyestuff from diazotized 3.4-dichloraniline and N-methyl-2-hydroxy-4-quinolone.

Example 4

The dyestuff obtainable by coupling diazotized m-nitraniline with N-ethyl-4-hydroxy-2-quinolone is added in an amount selected according to the desired strength of color (about 0.1 to 2 per cent of the material to be dyed) to a dye bath containing 2 to 3 grams of soap per litre and acetate silk is handled in this dye bath (employed in the proportion about 1:30) for about ½ hour at 60 to 75° C. The acetate silk is dyed clear greenish-yellow shades of excellent fastness properties.

Example 5

The dyestuff obtained by coupling diazotized 4-chloraniline with 6-amino-N-methyl-4-hydroxy-2-quinolone is added in an amount selected according to the desired depth of color (between about 0.2 and 2 per cent, calculated on the material to be dyed) to a bath containing 2 to 3 grams of soap per litre. Acetate silk is handled in this bath for about ½ hour at 60° to 75° C., the dye bath proportion being about 1:30. Golden yellow dyeings of good fastness properties are obtained.

Example 6

The dyestuff obtained by coupling diazotized aniline with 6-nitro-N-methyl-4-hydroxy-2-quinolone is used for dyeing acetate silk under otherwise the same conditions as described in the foregoing example. Clear golden yellow dyeings of good fastness to light are obtained.

The present application is a continuation-in-part of the application Ser. No. 375,325, filed on July 1st, 1929.

What we claim is:

1. The process which comprises dyeing acetate silk with a compound free from acid groups of the following formula:

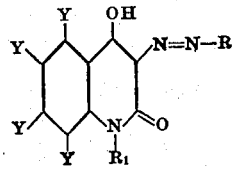

in which R stands for a radical of an aromatic amine, and $R_1$ stands for an alkyl radical, and Y for hydrogen or any substituent other than sulfonic and carboxylic acid groups.

2. The process which comprises dyeing acetate silk with a compound free from acid groups of the following formula:

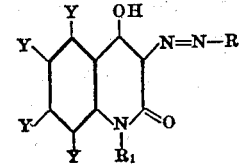

in which R stands for a radical of an aromatic amine, $R_1$ stands for an alkyl radical, and Y for hydrogen, halogen, a nitro- or an amino group.

3. The process which comprises dyeing acetate silk with a compound free from acid groups of the following formula:

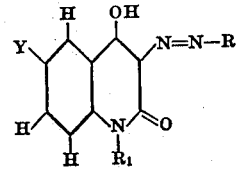

in which R stands for a radical of an aromatic amine, $R_1$ stands for an alkyl radical and Y for hydrogen, halogen, a nitro- or an amino group.

4. The process which comprises dyeing acetate silk with a compound of the following formula:

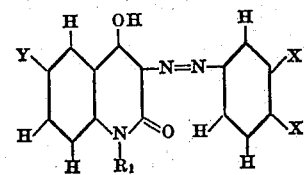

in which $R_1$ stands for an alkyl radical, Y for hydrogen, halogen, a nitro- or an amino group, and X for hydrogen, halogen, a nitro- or an amino group substituted by an alkyl group.

5. The process which comprises dyeing acetate silk with a compound of the following formula:

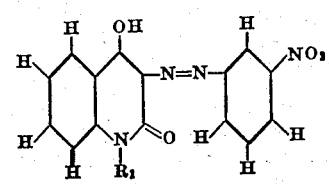

in which $R_1$ stands for an alkyl radical.

6. The process which comprises dyeing acetate silk with a compound of the following formula:

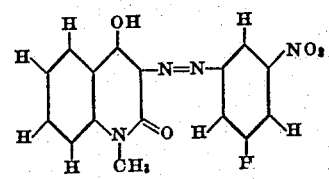

7. The process which comprises dyeing acetate silk with a compound of the following formula:

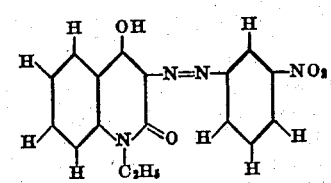

8. The process which comprises dyeing acetate silk with a compound of the following formula:

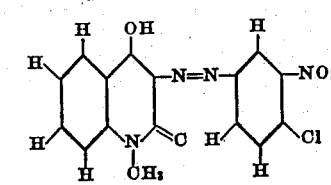

KARL HOLZACH.
GUIDO VON ROSENBERG.